(12) United States Patent
Matthias et al.

(10) Patent No.: US 8,869,913 B2
(45) Date of Patent: Oct. 28, 2014

(54) MAKING ELECTRICAL CONTACT WITH A RECHARGEABLE BATTERY HAVING A PLURALITY OF RECHARGEABLE BATTERY CELLS

(75) Inventors: Wolf Matthias, Stuttgart (DE); Thomas Heinrich, Nellmersbach (DE)

(73) Assignee: Robert Bosch GmbH, Stuttgart (DE)

( * ) Notice: Subject to any disclaimer, the term of this patent is extended or adjusted under 35 U.S.C. 154(b) by 689 days.

(21) Appl. No.: 13/003,635

(22) PCT Filed: Jun. 3, 2009

(86) PCT No.: PCT/EP2009/056780
§ 371 (c)(1),
(2), (4) Date: Apr. 7, 2011

(87) PCT Pub. No.: WO2010/003738
PCT Pub. Date: Jan. 14, 2010

(65) Prior Publication Data
US 2011/0180291 A1   Jul. 28, 2011

(30) Foreign Application Priority Data
Jul. 11, 2008   (DE) .................... 10 2008 040 341

(51) Int. Cl.
*H01M 10/46* (2006.01)
*H01M 10/42* (2006.01)
*H01M 2/20* (2006.01)
*H01R 4/04* (2006.01)

(52) U.S. Cl.
CPC ............ *H01M 2/204* (2013.01); *H01M 10/425* (2013.01); *H01R 4/04* (2013.01); *Y02E 60/12* (2013.01)
USPC .............................. 173/217; 310/50; 320/112

(58) Field of Classification Search
USPC .......... 173/217, 171; 320/107, 110, 112, 116; 310/47, 50; 429/62, 94, 96, 97, 99, 429/100, 120, 148, 156, 160; 439/76.1, 500
See application file for complete search history.

(56) References Cited

U.S. PATENT DOCUMENTS

| | | | |
|---|---|---|---|
| 5,197,889 A * | 3/1993 | Rizzo et al. ................. 439/76.1 |
| 5,853,915 A * | 12/1998 | Suto ................................ 429/99 |
| 5,977,746 A * | 11/1999 | Hershberger et al. ......... 320/112 |
| 6,399,238 B1 * | 6/2002 | Oweis et al. ..................... 429/99 |
| 6,455,190 B1 * | 9/2002 | Inoue et al. .................... 429/160 |
| 6,777,910 B2 * | 8/2004 | Small ............................. 320/106 |
| 6,972,544 B2 * | 12/2005 | Seman et al. ................. 320/112 |
| 7,604,896 B2 * | 10/2009 | Maguire et al. ............... 429/160 |
| 7,678,493 B2 * | 3/2010 | Morita et al. ................... 429/96 |
| 7,686,853 B2 * | 3/2010 | Seman et al. ................ 29/623.1 |
| 8,252,441 B2 * | 8/2012 | Planck ............................ 429/96 |
| 2008/0254356 A1 * | 10/2008 | Liersch et al. ................ 429/160 |

FOREIGN PATENT DOCUMENTS

| | | |
|---|---|---|
| CN | 20095934 | 10/2007 |
| WO | WO 2005/039012 A2 | 4/2005 |
| WO | WO 2007/033689 A1 | 3/2007 |

\* cited by examiner

*Primary Examiner* — Scott A. Smith
(74) *Attorney, Agent, or Firm* — Maginot, Moore & Beck

(57) ABSTRACT

In a rechargeable battery having a plurality of rechargeable battery cells, wherein at least one rechargeable battery cell is connected to an electronic component, which is associated with the rechargeable battery, via an electrical line, the electrical line has at least one contact element which is electrically conductively connected to the at least one rechargeable battery cell by an electrically conductive adhesive.

12 Claims, 3 Drawing Sheets

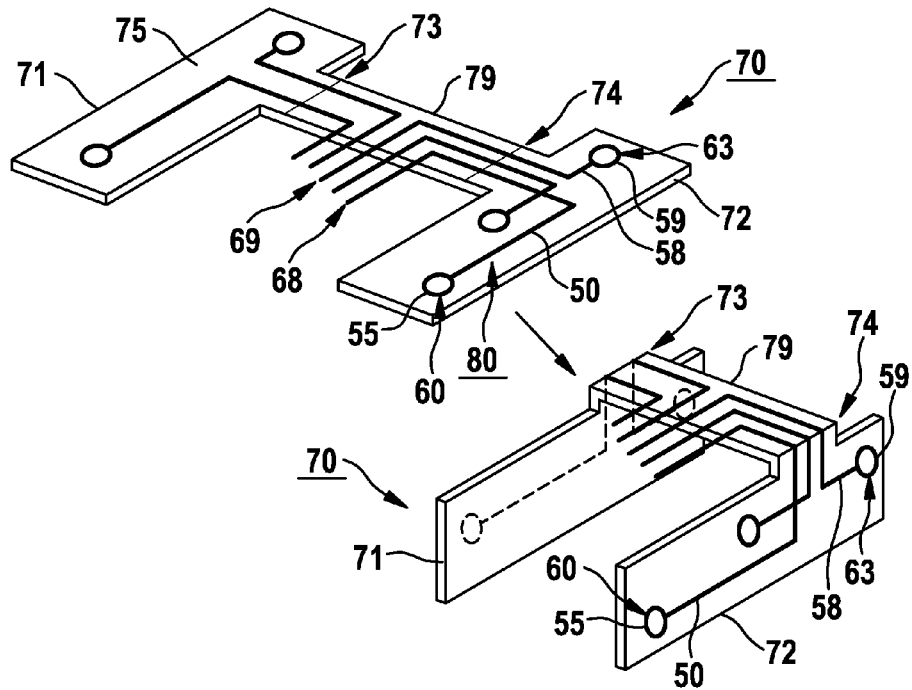
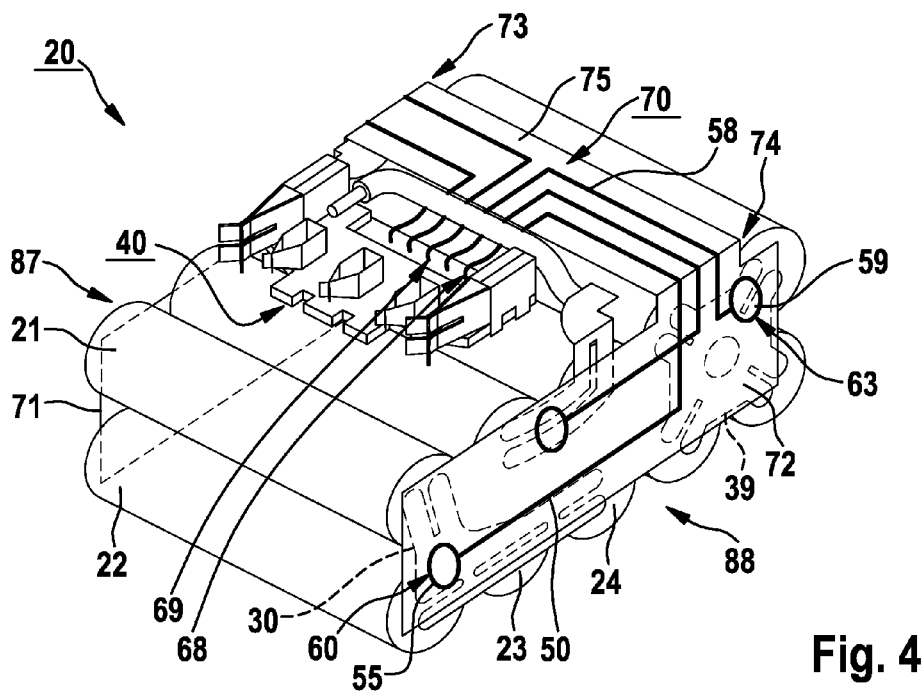
Fig. 3
Fig. 4

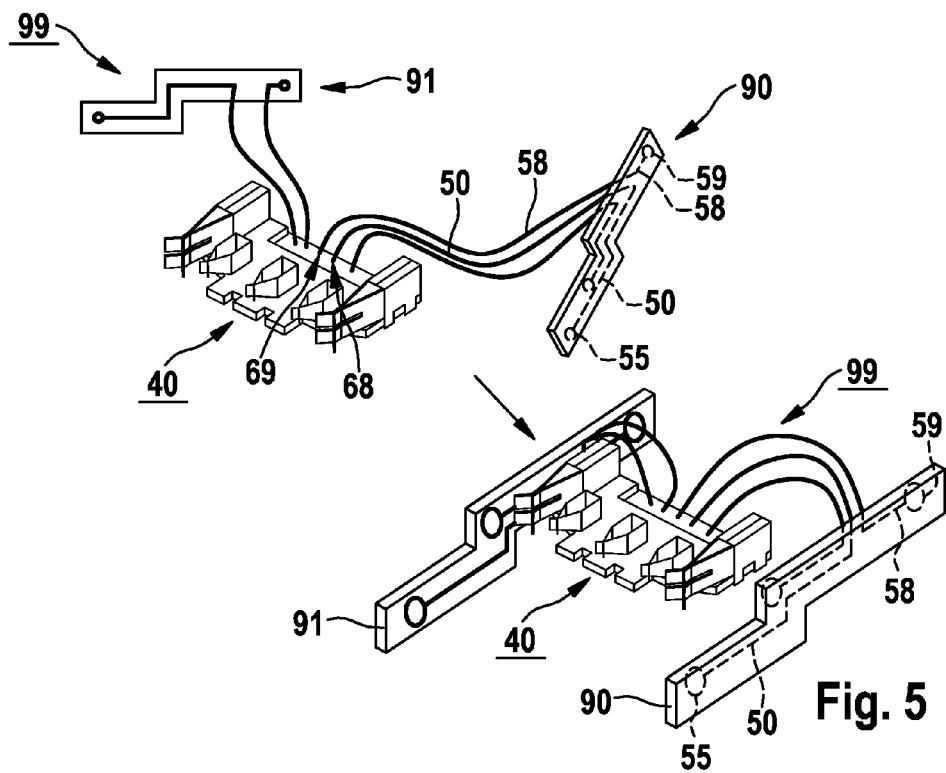
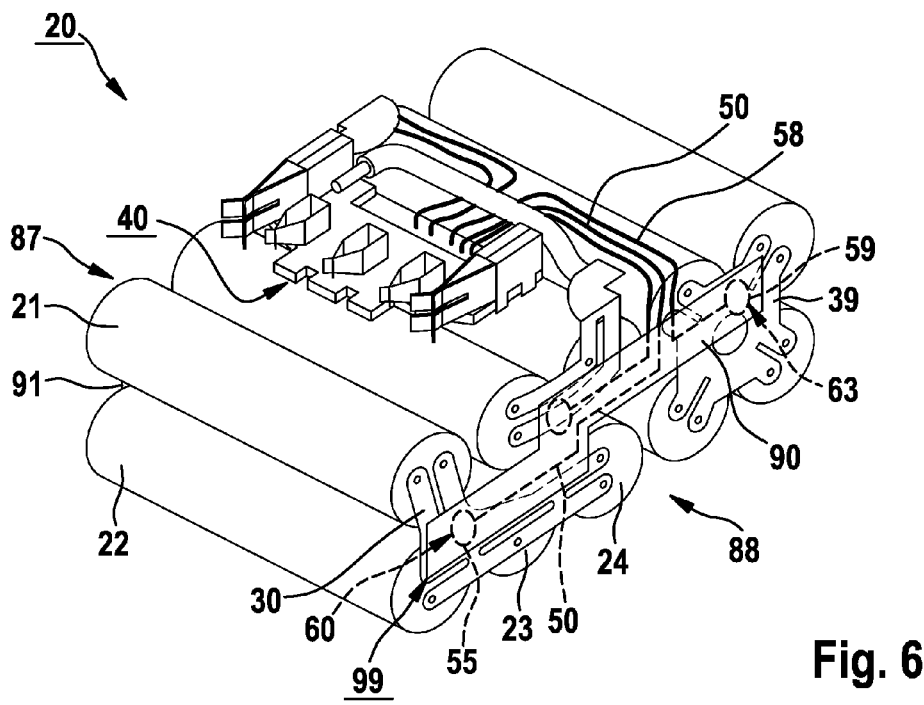

MAKING ELECTRICAL CONTACT WITH A RECHARGEABLE BATTERY HAVING A PLURALITY OF RECHARGEABLE BATTERY CELLS

This application is a National Stage Application of PCT/EP2009/056780, filed 3 Jun. 2009, which claims benefit of Ser. No. 10 2008 040 341.5, filed 11 Jul. 2008 in Germany and which applications are incorporated herein by reference. To the extent appropriate, a claim of priority is made to each of the above disclosed applications.

STATE OF THE ART BACKGROUND

The present invention relates to a rechargeable battery with several rechargeable battery cells, at which at least one rechargeable battery cell is connected via an electrical line to an electronic component that is associated with the rechargeable battery.

Rechargeable batteries usually consist of several rechargeable battery cells, which are interconnected as packs or modules and which are connected with each other in an electrically conductive way via so-called cell connectors. The individual rechargeable battery cells are thereby usually welded together with the cell connectors, for example by electronic components. The cell connectors can be connected with electronic components via electrical lines, which are associated with the rechargeable batteries and which serve for example at Li-ion batteries not only for controlling and if necessary operating the state of charge of the rechargeable battery as a whole but moreover the state of charge of each individual rechargeable battery cell separately.

Rechargeable batteries are known from the state of the art, at which the cell connectors are already connected to such electrical lines before the welding with the rechargeable battery cells, for example by a joint, so that a corresponding cable harness can be prebuilt before the welding. Rechargeable batteries are also known, at which such electrical lines are connected to the cell connectors after the welding of the cell connectors with the rechargeable battery cells, for example by a joint or by means of suitable plug-in connectors.

The disadvantage of the state of the art is that the prebuilt cable harnesses are difficult and complicated to handle, because the electrical lines that are fixed at the cell connector can be disturbing during the welding process. Furthermore there is a risk that an undesired contacting of one or several cell connectors with one or several rechargeable battery cells causes a short circuit of individual rechargeable battery cells after the welding of one or several cell connectors. When soldering a joint after the welding there is the problem that an unintended damage of the rechargeable battery cells can occur by introducing a too big amount of heat during the soldering process, because in particular LI-ion cells are very sensitive to heat. At plug-in connectors on the other hand there is the problem that they are complex and cost-intensive to manufacture and require a relatively big space for making contact. Furthermore there is the problem with plug-in connectors, that dirt and corrosion can cause an insufficient contacting of the electrical line and therefore a bad electrical connection with the associated electronic component.

SUMMARY

One task of the invention is therefore to provide a new rechargeable battery with several rechargeable battery cells, at which a secure and stable connection of at least one rechargeable battery cell with an electronic component that is associated with the rechargeable battery via an electrical line is enabled, whereby the above described disadvantages of the state of the art are avoided.

This problem is solved by a rechargeable battery with several rechargeable battery cells, whereby at least one rechargeable battery cell is connected via an electrical line with an electronic component that is associated with the rechargeable battery. The electrical line provides at least one contact element, which is connected in an electrically conductive way to the at least one rechargeable battery cell via an electrically conductive adhesive.

According to an embodiment at least two rechargeable battery cells are connected with each other in an electrically conductive way via a cell connector. The cell connector is arranged between the at least one rechargeable battery cell and the contact element. The contact element is connected in an electrically conductive way with the cell connector via electrically conductive adhesive.

Therefore a secure, stable, inexpensive and space-saving connection between the contact element and the cell connector can be created due to the electrically conductive adhesive.

The electrical line and the contact element are preferably arranged on a carrier element. The carrier element is preferably a carrier foil, which can be fixed at at least two or several rechargeable battery cells for a fixation at the rechargeable battery, whereby the electrical line is construed as a flexible conductor path on the carrier foil. The flexible conductor path can implement the electronic component at least partially.

The invention allows therefore a pre-assembling of a suitable carrier foil, which can be fixed quickly and easily at the rechargeable battery, whereby stable and secure electrically conductive connections between the contact element and the rechargeable battery cells or cell connectors can be created due to the electrically conductive adhesive. The mounting can be simplified and a wrong contacting can be avoided thereby by a corresponding construction of the carrier foil.

According to one embodiment the contacting element is arranged on a fixing element, which can be fixed at at least two or several rechargeable battery cells for the fixation at the rechargeable battery.

Thus a wrong contacting can be avoided with simple means when mounting the electrical lines at the rechargeable battery.

The problem that has been mentioned at the beginning can also be solved by a contacting element, which can be fixed at an electrical line, which is construed in a rechargeable battery with several rechargeable battery cells for an electrically conductive connection of at least one rechargeable battery cell with an electronic component that is associated with the rechargeable battery. The contacting element can be connected in an electrically conductive way with the at least one rechargeable battery cell via an electrically conductive adhesive.

The problem that has been mentioned at the beginning is also solved by a carrier foil for a rechargeable battery with several rechargeable battery cells. The carrier foil can be fixed at least two of the several rechargeable battery cells for a fixation at the rechargeable battery and provides a flexible conductor path, which creates at least one electrical line with a contact element, whereby the contact element can be connected in an electrically conductive way with at least one rechargeable battery cell via an electrically conductive adhesive.

The problem that has been mentioned in the beginning is furthermore solved by an electronic machine tool with a rechargeable battery, which provides several rechargeable battery cells, whereby at least one rechargeable battery cell is connected to an electronic component that is associated with the rechargeable battery via an electrical line. The electrical line provides at least one contact element, which is connected to the at least one rechargeable battery cell in an electrically conductive way via an electrically conductive adhesive.

BRIEF DESCRIPTION OF THE DRAWINGS

The invention is further explained in the subsequent description with the aid of an embodiment that is illustrated in the drawings.

It is shown in.

DETAILED DESCRIPTION

Figure 1:
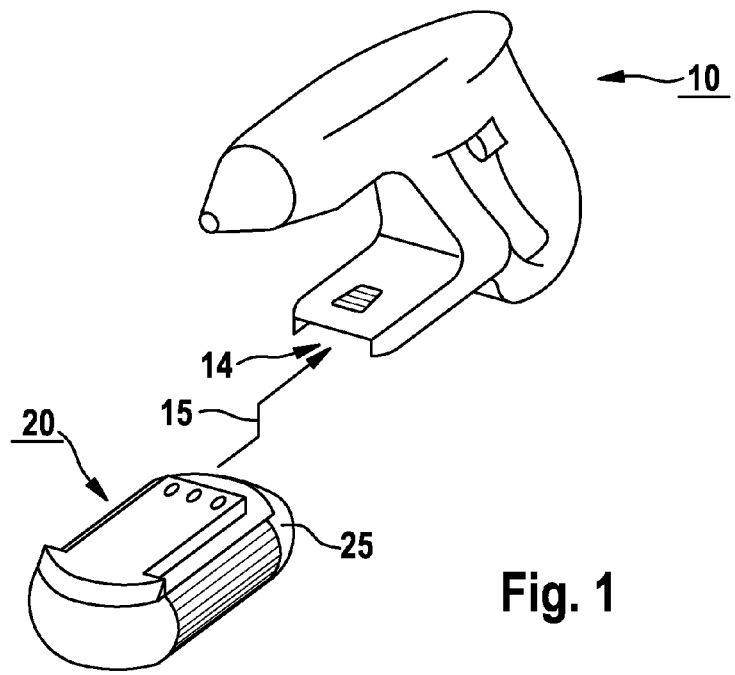
FIG. 1 a perspective illustration of an electronic machine tool with a rechargeable battery according to the invention, FIG. 2 a perspective view of the rechargeable battery in FIG. 1 with a contact element according to one embodiment, FIG. 3 a perspective illustration of a carrier element according to an embodiment, FIG. 4 a perspective view of the rechargeable battery in FIG. 1 with the carrier element in FIG. 3, FIG. 5 a perspective illustration of a cable harness according to an embodiment, and FIG. 6 a perspective view of the rechargeable battery in FIG. 1 with the cable harness in FIG. 5.

FIG. 1 shows an electronic machine tool 10 and a rechargeable battery 20 with a rechargeable battery housing 25. The electronic machine tool 10 can be connected mechanically and electrically with the rechargeable battery via an interface 14 for a self-contained current supply. The rechargeable battery 20 is therefore inserted into the interface 14 in the direction of an arrow 15 and catches there, whereby automatically an electronic connection between the rechargeable battery 20 and the electronic machine tool 10 is created.

The machine tool 10 is construed exemplarily as cordless drilling screwdriver in FIG. 1. But is shall be pointed out that the present invention is not limited to cordless drill screwdrivers, but can be moreover applied to different cordless operated electronic machine tools, for example a drill hammer, an angle sander, a lawnmower etc.

Figure 2:
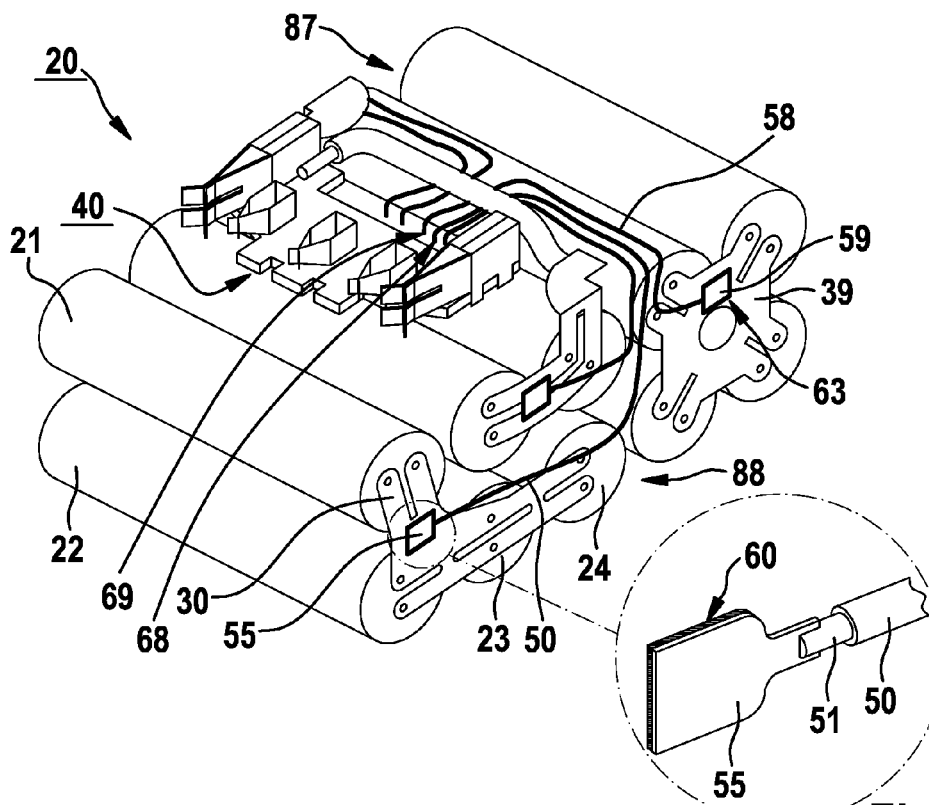

FIG. 2 shows the rechargeable battery 20 in FIG. 1, which is illustrated without the rechargeable battery housing 25 for clarifying a first embodiment. The rechargeable battery 20 provides exemplarily ten rechargeable battery cells with cell headers 88 and opposite cell headers 87, of which only the rechargeable battery cells 21, 22, 23, 24 are labeled for clarification purposes and for a clearness of the illustration. They are connected with each other in an electrically conductive way at their cell headers 88 via a cell connector 30.

The cell connector 30 is connected via an electrical line 50 with an electronic component 40, which is associated with the rechargeable battery 20 and which provides a protective circuit for the rechargeable battery 20 and/or connection elements for contacting the electronic machine tool 10 in FIG. 1. Therefore an end 68 of the line 50 is connected at the electronic component 40. A contact element 55 is provided at its other end 51, for example a metal plate, which is connected in an electrically conductive way with the cell connector 30 via an electrically conductive adhesive 60. But it is pointed out that the contact element 55 can also be affixed directly on to one of the cell headers 88 of the rechargeable battery cells 21, 22, 23, 24.

According to an embodiment the contact element 55 is self-adhesively coated with the electrically conductive adhesive 60. The adhesive 60 preferably provides synthetic resin, for example light-activated epoxy resin and/or 2K-epoxy resin) 2-component epoxy resin). The synthetic resin is mixed with at least one electrically conductive component. The synthetic resin is preferable mixed with a percentage of silver powder, which is sufficiently high, in order for the adhesive 60 to provide an electrical conductivity, which is approximately equivalent to a well conducting metal, for example copper.

In order to interconnect the rechargeable battery cell of the rechargeable battery 20 application-specified to a pack or module, also other cells are connected with each other at their cell headers 87 or 88 in an electrically conductive way via corresponding cell connectors as it can be seen in FIG. 2 and as it is indicated with a cell connector 39. It is connected via an electrically conductive adhesive 63 in an electrically conductive way with a contact element 59, which is fixed at the end of an electrical line 58, which is connected with the electronic component 40 at its other end 69.

FIG. 3 shows a carrier element 70, on which the lines 50, 58 are construed with the assigned contact elements 55 or 59. The carrier element 70 is preferable a pre-assembled carrier foil 75, on which the lines 50, 58 and contact elements 55, 59 are construed as a flexible conductor path 80. According to an embodiment the flexible conductor path 80 also implements the electronic component 40 at least partially. But FIG. 3 shows one embodiment of the carrier foil 75, in which the ends 68, 69 of the lines 50 or 58 stick out of the carrier foil 75 for contacting a separately construed electronic component 40, as described in FIG. 4.

As it can be seen in FIG. 3 the carrier foil 75 exemplarily provides a middle part 79 and two side parts 71, 72, which can be folded on top of each other at associated folding lines 73, 74 for mounting on the rechargeable battery cells 21, 22, 23, 24. For a fixation at the rechargeable battery 20 at least the side parts 71, 72 can each be fixed at at least two of the rechargeable battery cells 21, 22, 23, 24, preferable at their cell headers 87, or 88, for example with the aid of an non-conducting adhesive connection. Alternatively only the contact elements 55, 59 can also be construed self-adhesive as described above.

In order to clarify a second embodiment FIG. 4 shows the rechargeable battery 20 in FIG. 1 without the rechargeable battery housing 25, at which the carrier element 70 in FIG. 3 construed as carrier foil 75 is fixed. Therefore its side parts 71, 72 are preferable affixed on to the cell headers 87 or 88 via suitable adhesive connections. The contact elements 55, 59 contact thereby the cell connectors 30, 39 in an electrically conductive way via provided electrically conductive adhesives 60 or 63 and the ends 68, 69 of the lines 50, 58 are arranged in the area of the electronic component 40 and can therefore be connected to it in an electrically conductive way.

FIG. 5 shows a cable harness 99 with two fixing elements 90, 91, on which at least the contact elements of the electrical lines in FIG. 1 are fixed. The contact elements 55, 59 of the electrical lines 50 or 59 are for example fixed on the fixing element 90, whose ends 68, 69 are connected to the electronic component 40 in an electrically conductive way. The electrical lines 50, 58 are at least arranged in sections on the fixing element 90, preferable the section of the line s50, 58 that run along the fixing element 90, as shown in FIG. 6.

For a fixation at the rechargeable battery 20 the fixing elements 90, 91 can each be fixed at at least two of the rechargeable battery cells 21, 22, 23, 24. The fixing elements 90, 91 can therefore be for example affixed on the cell headers 87, 88 of at least two of the rechargeable battery cells 21, 22, 23, 24, for example with the aid of a non-conductive adhesive connection. Alternatively only the contact elements 55, 59 can be construed self-adhesive as described above.

FIG. 6 shows the rechargeable battery 20 in FIG. 1, at which the cable harness 99 in FIG. 5 is fixed, without the rechargeable battery housing 25 in order to clarify a third embodiment. Its fixing elements 90, 91 are therefore preferable affixed on the cell headers 87, 88 via suitable adhesive connections. The contact elements 55, 59 contact thereby the cell connectors 30, 39 in an electrically conductive way, as it is described in FIGS. 2 and 4.

The invention claimed is:

1. A rechargeable battery comprising:
    at least two rechargeable battery cells, the at least two rechargeable battery cells in electrical communication with each other through a cell connector;
    an electronic component connected to a first rechargeable battery cell of the at least two rechargeable battery cells by way of an electrical line;
    the electrical line having at least one contact element;
    wherein the cell connector is disposed between the at least two rechargeable battery cells and the contact element,
    the contact element is connected in an electrically conductive way to the cell connector with an electrically conductive adhesive,
    the electrical line and the contact element are arranged on a carrier element in the form of a carrier foil fixed to the first rechargeable battery cell, and
    the electrical line comprises a flexible conductor path on the carrier foil.

2. The rechargeable battery according to claim 1, wherein the flexible conductor path implements the electronic component at least partially.

3. The rechargeable battery according to claim 1, wherein the contact element is arranged on a fixing element, which is fixed to the at least two rechargeable battery cells.

4. The rechargeable battery according to claim 3, wherein at least a section of the electrical line is arranged on the fixing element.

5. The rechargeable battery of claim 1, wherein the electrically conductive adhesive comprises a synthetic resin mixed with an electrically conductive component.

6. The rechargeable battery of claim 5, wherein the electrically conductive adhesive comprises a light-activated epoxy resin.

7. The rechargeable battery of claim 6, wherein the electrically conductive adhesive further comprises a two-component epoxy resin and silver powder.

8. The rechargeable battery of claim 1, wherein the carrier foil comprises:
    a middle part;
    a first side part folded downwardly from the middle part; and
    a second side part folded downwardly from the middle part.

9. The rechargeable battery of claim 8, wherein:
    the first side is fixed to a fixed end of the first rechargeable cell; and
    the second side part is fixed to a second end of the first rechargeable cell.

10. A machine tool, comprising:
    a rechargeable battery, wherein the rechargeable battery comprises at least two rechargeable battery cells in electrical communication through a cell connector;
    a first of the at least two rechargeable battery cells connected to an electronic component, the electronic component electronically connected to the rechargeable battery by way of an electrical line; and
    the electrical line comprising a flexible conductor path on a carrier foil, and at least one contact element, wherein
    the at least one contact element is connected to the cell connector in an electrically conductive way by way of an electrically conductive adhesive, and
    the cell connector is disposed between the at least two rechargeable battery cells and the contact element.

11. A rechargeable battery, comprising:
    at least two rechargeable battery cells, the at least two rechargeable battery cells connected to each other and conducting electricity by way of a cell connector; and
    an electronic component connected to a first of the at least two rechargeable battery cells by way of an electrical line, the electrical line embodied as a flexible cable, wherein
    the electrical line includes at least one contact element, the contact element embodied as a metal plate,
    the cell connector is disposed between the at least two rechargeable battery cells and the contact element, and
    the contact element is connected in an electrically conductive way to the cell connector with an electrically conductive adhesive.

12. A rechargeable battery, comprising:
    at least two rechargeable battery cells, the at least two rechargeable battery cells connected to each other and conducting electricity by way of a cell connector; and
    an electronic component connected to a first of the at least two rechargeable battery cells by way of electrical lines, the electrical lines embodied as a cable harness having at least one fixing element fixed to the first of the at least two rechargeable battery cells, wherein
    the electrical lines include at least one contact element, the contact element fixed to the at least one fixing element of the cable harness,
    the cell connector is disposed between the at least two rechargeable battery cells and the contact element, and
    the contact element is connected in an electrically conductive way to the cell connector with an electrically conductive adhesive.

* * * * *

UNITED STATES PATENT AND TRADEMARK OFFICE
CERTIFICATE OF CORRECTION

| | | |
|---|---|---|
| PATENT NO. | : 8,869,913 B2 | Page 1 of 1 |
| APPLICATION NO. | : 13/003635 | |
| DATED | : October 28, 2014 | |
| INVENTOR(S) | : Matthias et al. | |

It is certified that error appears in the above-identified patent and that said Letters Patent is hereby corrected as shown below:

In the Claims,

In column 6, lines 1-5, claim 9 should read as follows:

> 9. The rechargeable battery of claim 8, wherein:
> the first side part is fixed to a first end of the first rechargeable cell; and
> the second side part is fixed to a second end of the first rechargeable cell.

Signed and Sealed this
Thirty-first Day of March, 2015

Michelle K. Lee
*Director of the United States Patent and Trademark Office*